United States Patent
Sutardja

(10) Patent No.: US 8,799,568 B1
(45) Date of Patent: *Aug. 5, 2014

(54) STORAGE DEVICE CACHE

(75) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 330 days.

This patent is subject to a terminal disclaimer.

(21) Appl. No.: 13/109,659

(22) Filed: May 17, 2011

Related U.S. Application Data

(63) Continuation of application No. 11/893,692, filed on Aug. 17, 2007, now Pat. No. 7,945,728.

(60) Provisional application No. 60/944,665, filed on Jun. 18, 2007.

(51) Int. Cl.
*G06F 12/00* (2006.01)
*G06F 13/00* (2006.01)
*G06F 13/28* (2006.01)

(52) U.S. Cl.
USPC .......................................... 711/112

(58) Field of Classification Search
USPC .......................................... 711/112
See application file for complete search history.

(56) References Cited

U.S. PATENT DOCUMENTS

| 6,000,006 A | 12/1999 | Bruce et al. |
| 6,016,275 A | 1/2000 | Han |
| 2003/0189868 A1 | 10/2003 | Riesenman et al. |
| 2005/0108707 A1 | 5/2005 | Taylor et al. |
| 2005/0246487 A1 | 11/2005 | Ergan et al. |
| 2007/0260811 A1 | 11/2007 | Merry et al. |

*Primary Examiner* — Sheng-Jen Tsai

(57) ABSTRACT

A method of operating a mass storage device including caching data in a nonvolatile semiconductor memory, in which the nonvolatile semiconductor memory has a predetermined usable lifetime. The method includes iteratively performing an operation on the nonvolatile semiconductor memory until the nonvolatile semiconductor memory reaches a predetermined state, wherein the operation includes an erase operation or a program operation; and determining an extent to which the nonvolatile semiconductor memory has degraded in response to a number of iterations of the operation required for the nonvolatile semiconductor memory to reach the predetermined state. The method also includes determining whether the nonvolatile semiconductor memory has reached the predetermined usable lifetime in response to the extent to which the nonvolatile semiconductor memory has degraded. The method further includes, in response to the nonvolatile semiconductor memory having reached the predetermined usable lifetime, suspending the caching of data in the nonvolatile semiconductor memory.

13 Claims, 18 Drawing Sheets

US 8,799,568 B1

STORAGE DEVICE CACHE

CROSS-REFERENCE TO RELATED APPLICATIONS

This disclosure is a continuation of U.S. patent application Ser. No. 11/893,692 (now U.S. Pat. No. 7,945,728), filed on Aug. 17, 2007, which claims the benefit of U.S. Provisional Application No. 60/944,665, filed on Jun. 18, 2007.

TECHNICAL FIELD

The present disclosure relates to memories in mass storage devices, and more specifically to handling finite lifetimes of nonvolatile semiconductor memories.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platter 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (R/W) channel module 28.

The HDD PCB 14 includes the R/W channel module 28, a hard disk controller (HDC) module 30, a processor 32, a spindle/VCM driver module 34, volatile memory 36, nonvolatile memory 38, and an input/output (I/O) interface 40. During write operations, the R/W channel module 28 may encode the data to increase reliability, such as by using error correction coding (ECC), run length limited (RLL) coding, Reed-Solomon encoding, etc. The R/W channel module 28 then transmits the encoded data to the preamplifier device 26.

During read operations, the R/W channel module 28 receives analog signals from the preamplifier device 26. The R/W channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22.

Volatile memory 36 and nonvolatile memory 38 may be used to store information such as controller data, cached data waiting to be written to the HDA 12 or read by the I/O interface 40, and/or temporary values. Volatile memory 36 may include Dynamic Random Access Memory (DRAM), Synchronous DRAM, Rambus DRAM, etc. Nonvolatile memory 38 may include flash memory (including NAND and NOR flash memory), static RAM, magnetic RAM, and multi-state memory, in which each memory cell has more than two states.

Using nonvolatile memory 38 to cache data waiting to be written to the HDA 12 or read by the I/O interface 40 has a number of possible benefits. These benefits include faster access time, higher transfer rate, power savings, quicker resumption from a hibernate state, and greater reliability. Data read from the HDA 12 or not yet written to the HDA 12 can be accessed more quickly from nonvolatile memory 38 than from the HDA 12.

Further, data can be accessed from nonvolatile memory 38 without having to power the HDA 12 and spin the platters 16. The HDA 12 may then only require power intermittently to provide read data to nonvolatile memory 38 and flush write data from nonvolatile memory 38. While the platters 16 are not rotating, the HDA 12 is much less prone to physical damage, such as from drops or sudden impacts.

The HDC module 30 communicates with an external device (not shown), such as a host adapter within a host device, via the I/O interface 40. The HDC module 30 may receive data to be stored from the external device, and may transmit retrieved data to the external device. The processor 32 processes data, including encoding, decoding, filtering, and/or formatting.

Additionally, the processor 32 processes servo or positioning information to position the heads 20 over the platters 16 during read/write operations. Servo, which is stored on the platters 16, ensures that data is written to and read from correct locations on the platters 16. In some implementations, a self-servo write (SSW) module 42 may write servo on the platters 16, using the heads 20, prior to storing data in the HDD 10.

SUMMARY

In general, in one aspect, this specification describes a method an apparatus for operating a mass storage device. The method includes caching data in nonvolatile semiconductor memory, and determining whether the nonvolatile semiconductor memory has reached a predetermined usable lifetime. In response to the nonvolatile semiconductor memory having reached the predetermined usable lifetime, suspending the caching of data in the nonvolatile semiconductor memory, determining (i) a block of memory within the nonvolatile semiconductor memory having experienced a low number of erases and (ii) a block of memory within the nonvolatile semiconductor memory having experienced a high number of erases, storing data within the block of memory having experienced the low number of erases into the block of memory having experienced the high number of erases, and unsuspending the caching of data in the nonvolatile semiconductor memory so that the nonvolatile semiconductor memory is once again usable to cache data.

In still other features, the systems and methods described above are implemented by a computer program executed by one or more processors. The computer program can reside on a computer readable medium such as but not limited to memory, nonvolatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
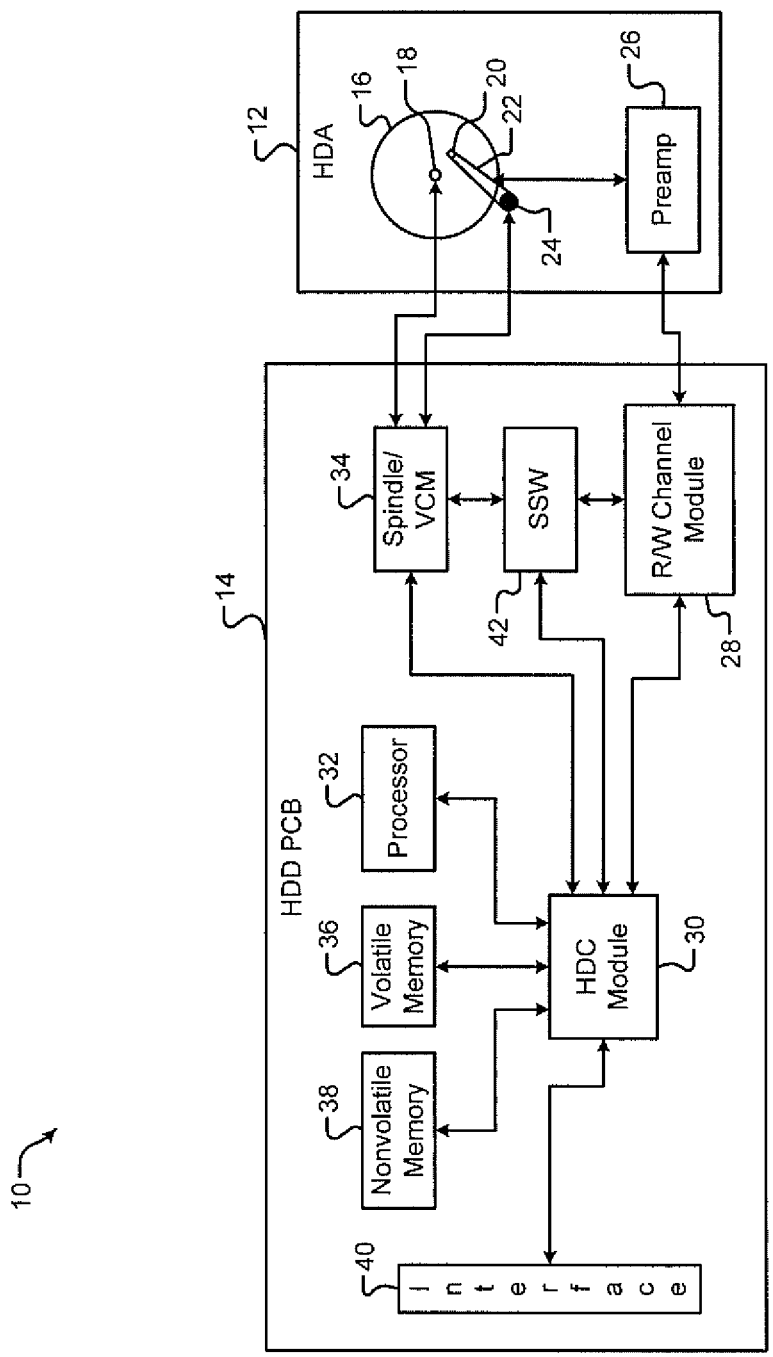
FIG. 1 is a functional block diagram of a hard disk drive (HDD)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module, circuit, and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
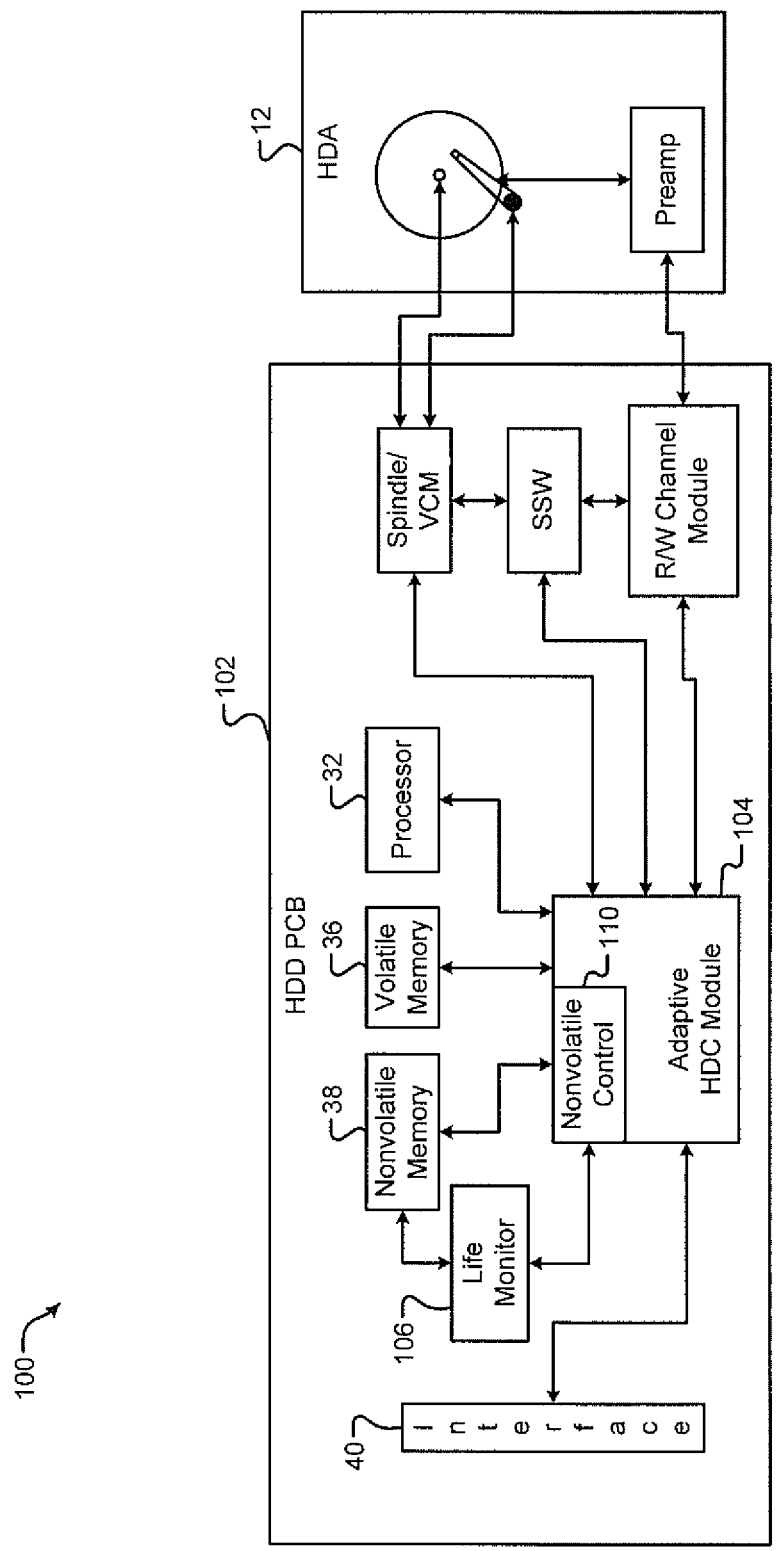
FIGS. 2-6 are functional block diagrams of exemplary implementations of mass storage devices according to the principles of the present disclosure.

Referring now to FIG. 2, a functional block diagram of an exemplary mass storage device according to the principles of the present disclosure is presented. For purposes of clarity, reference numerals from FIG. 1 have been used to identify similar components. For purposes of explanation, the mass storage device is shown as a hard disk drive (HDD) 100.

The mass storage device may also comprise tape drives, optical drives such as compact disc (CD) or digital versatile disc (DVD) drives, network attached storage (NAS) devices, storage devices comprising high-latency nonvolatile memory, etc. The HDD 100 includes the HDA 12 and a HDD printed circuit board (PCB) 102. The HDD PCB 102 includes components described above, an adaptive HDC module 104, and a life monitor module 106.

The I/O interface 40 of the HDD PCB 102 may include wired and/or wireless communication links, such as WLAN, Ethernet, SATA, ATA, IDE, EIDE, SCSI, etc. Host devices may include computers, multimedia devices, and mobile computing devices. Multimedia devices may include televisions, set top boxes, digital video recorders, etc. Mobile computing devices may include personal digital assistants, cellular phones, media or MP3 players, etc.

The adaptive HDC module 104 includes a nonvolatile control module 110 that communicates with nonvolatile memory 38. The adaptive HDC module 104 can use volatile memory 36 to cache data waiting to be written to the HDA 12 or read by the I/O interface 40. Nonvolatile semiconductor memory typically has a finite lifetime, on the order of 10,000, 100,000, or 1,000,000 program/erase cycles, which is much shorter than the lifetime of a typical HDD.

When nonvolatile memory 38 is used for frequently updated data, such as when using nonvolatile memory 38 as a cache, the finite lifetime of nonvolatile memory 38 becomes a practical concern. Once the nonvolatile memory 38 has reached the end of its usable lifetime, the HDD 100 will become unreliable due to the unreliability of nonvolatile memory 38. Instead of simply becoming unreliable, the HDD 100 can identify itself as no longer being usable, thereby requiring replacement.

Alternatively, the HDD 100 may stop using nonvolatile memory 38 as a cache for error-sensitive data. In various implementations, the HDD 100 may still use nonvolatile memory 38 as a cache for error-tolerant data such as selected video and/or audio data. The HDD 100 may signal to the external device via the I/O interface 40 that the HDD 100 is operating without a nonvolatile cache.

The external device may then make changes in its usage of the HDD 100, and may signal to a user that the HDD 100 should be replaced. The entire HDD 100 or nonvolatile memory 38 may be replaced. The nonvolatile control module 110 can coordinate powering down nonvolatile memory 38 and, thus preventing future writes to the nonvolatile memory 38. The nonvolatile control module 110 may flush the contents of nonvolatile memory 38 before deactivating the nonvolatile memory 38.

The adaptive HDC module 104 may substitute volatile memory 36 and/or standby memory (not shown) for the caching function of nonvolatile memory 38. As the usable lifetime of nonvolatile memory 38 nears its end, the adaptive HDC module 104 may suspend caching less important data to prolong the usability of nonvolatile memory 38. To preserve the basic function of the HDD 100 once nonvolatile memory 38 has reached the end of its usable lifetime, the HDD 100 includes the life monitor module 106.

The life monitor module 106 estimates whether nonvolatile memory 38 has reached the end of its usable lifetime. The life monitor module 106 may be a stand-alone module that communicates with nonvolatile memory 38 and the nonvolatile control module 110, as shown in FIG. 2. The life monitor module 106 may also monitor communications between nonvolatile memory 38 and the nonvolatile control module 110. The functions of the life monitor module 106 may be performed by code that is executed on the processor 32.

Figure 3:
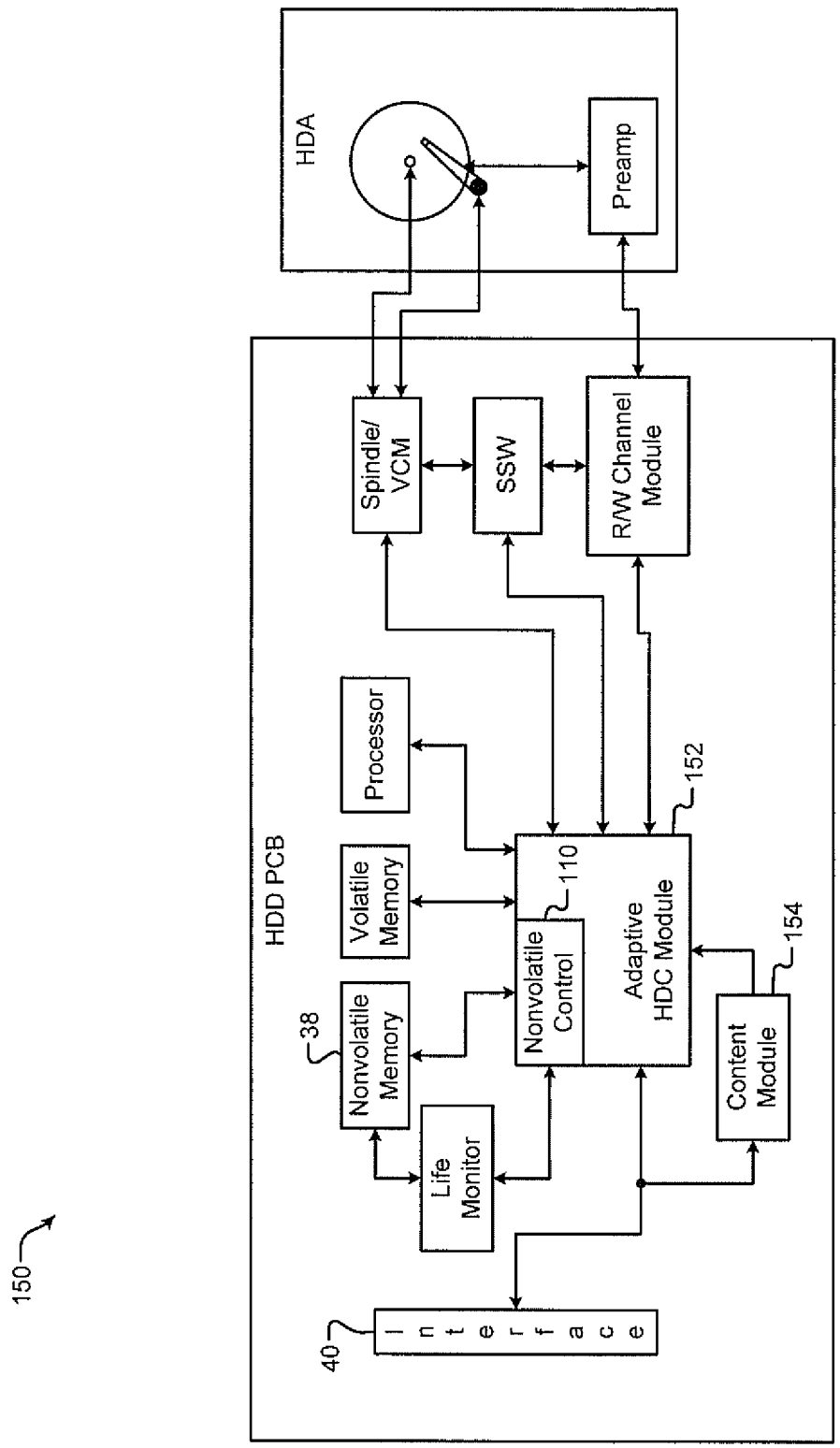

Referring now to FIG. 3, a functional block diagram of another exemplary implementation of a mass storage device is depicted. For purposes of explanation, the mass storage device is shown as a hard disk drive (HDD) 150. The HDD 150 includes an adaptive HDC module 152. For purposes of clarity, reference numerals from FIG. 2 have been used to identify similar components. When nonvolatile memory 38 has exceeded its usable lifetime, the adaptive HDC module 152 may, instead of deactivating nonvolatile memory 38, use nonvolatile memory 38 for data that is error tolerant.

Error tolerant data includes uncompressed audio and video. Determining whether data is error tolerant may require the cooperation of the external device that is connected to the HDD 150 via the I/O interface 40. For instance, an operating system driver within the external interface may indicate to the HDD 150 what data is error tolerant.

Alternatively, the HDD 150 may include a content module 154. The content module 154 analyzes data received from the I/O interface 40. Based upon the contents of the data, the content module 154 can indicate to the adaptive HDC module 152 whether the data is error tolerant and able to be cached in nonvolatile memory 38, even once nonvolatile memory 38 has reached the end of its usable lifetime.

The content module 154 may examine file headers or file names to determine whether data is error tolerant. The content module 154 may also receive this information from an operating system in communication with the I/O interface 40. The nonvolatile control module 110 can then send data recognized as error tolerant to nonvolatile memory 38.

Figure 4:
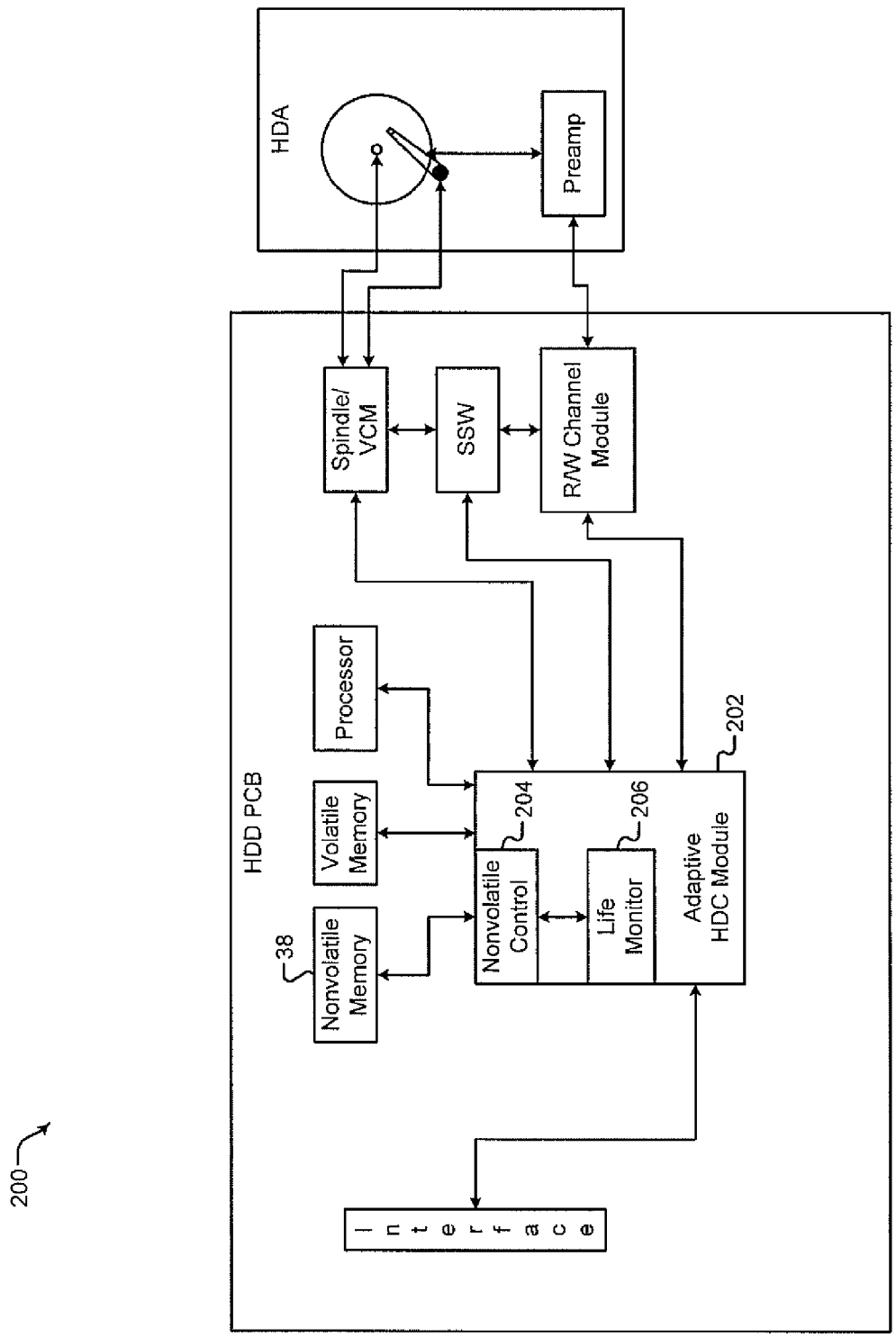

Referring now to FIG. 4, a functional block diagram of another exemplary implementation of a mass storage device is depicted. For purposes of explanation, the mass storage device is shown as a hard disk drive (HDD) 200. The HDD 200 includes an adaptive HDC module 202 containing a nonvolatile control module 204 that communicates with nonvolatile memory 38. For purposes of clarity, reference numerals from FIG. 1 have been used to identify similar components. The adaptive HDC module 202 also contains a life monitor module 206, which communicates with the nonvolatile control module 204.

Figure 5:
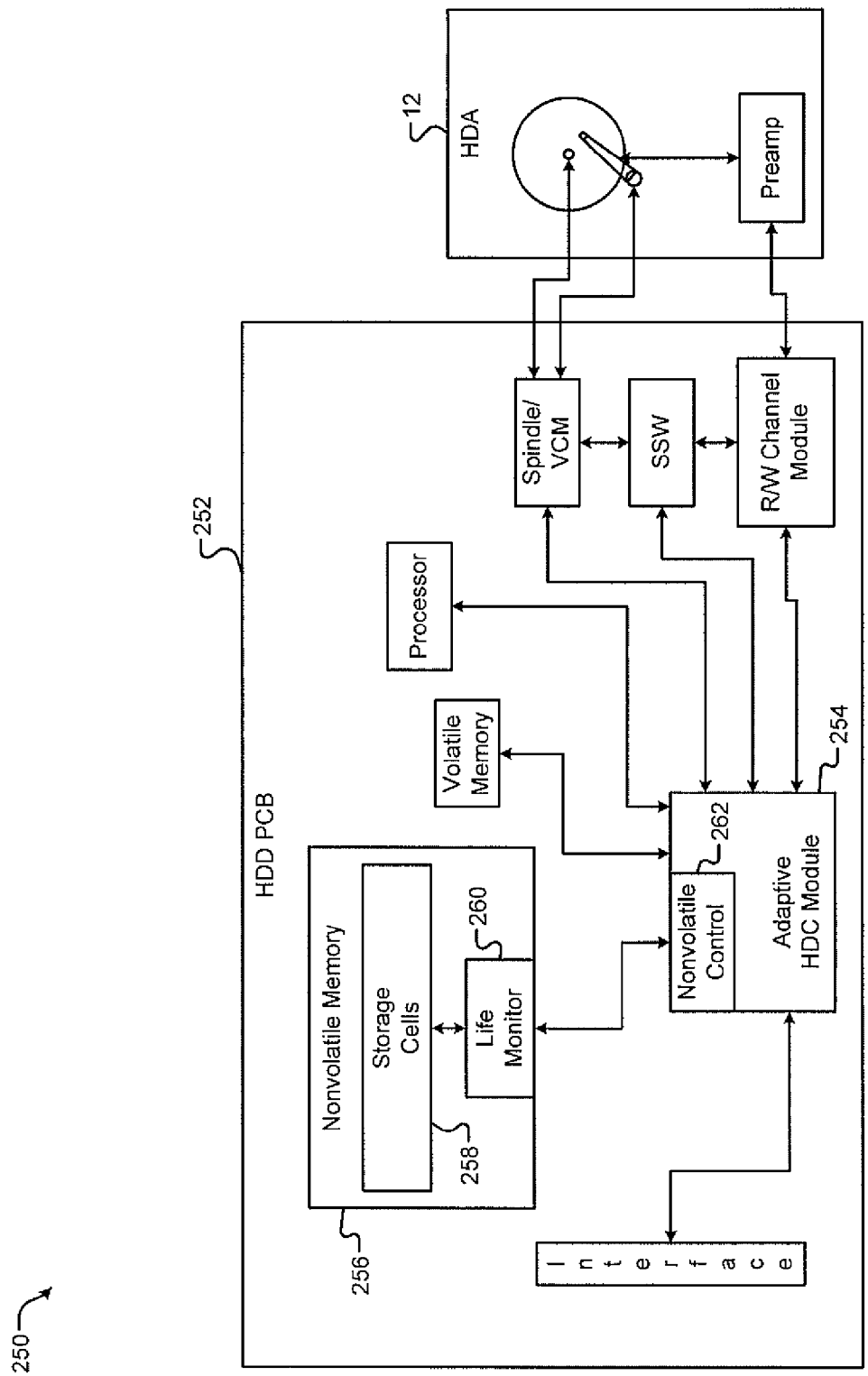

Referring now to FIG. 5, a functional block diagram of another exemplary implementation of a mass storage device is depicted. For purposes of clarity, reference numerals from FIG. 1 have been used to identify similar components. For purposes of explanation, the mass storage device is shown as a hard disk drive (HDD) 250. The HDD 250 includes the HDA 12 and a HDD printed circuit board (PCB) 252. The HDD PCB 252 includes an adaptive HDC module 254 and nonvolatile memory 256.

Nonvolatile memory 256 includes storage cells 258 and a life monitor module 260, which communicates with a nonvolatile control module 262 integrated with the adaptive HDC module 254. The life monitor module 260 analyzes requests from the nonvolatile control module 262 and communicates data to and from the storage cells 258.

Figure 6:
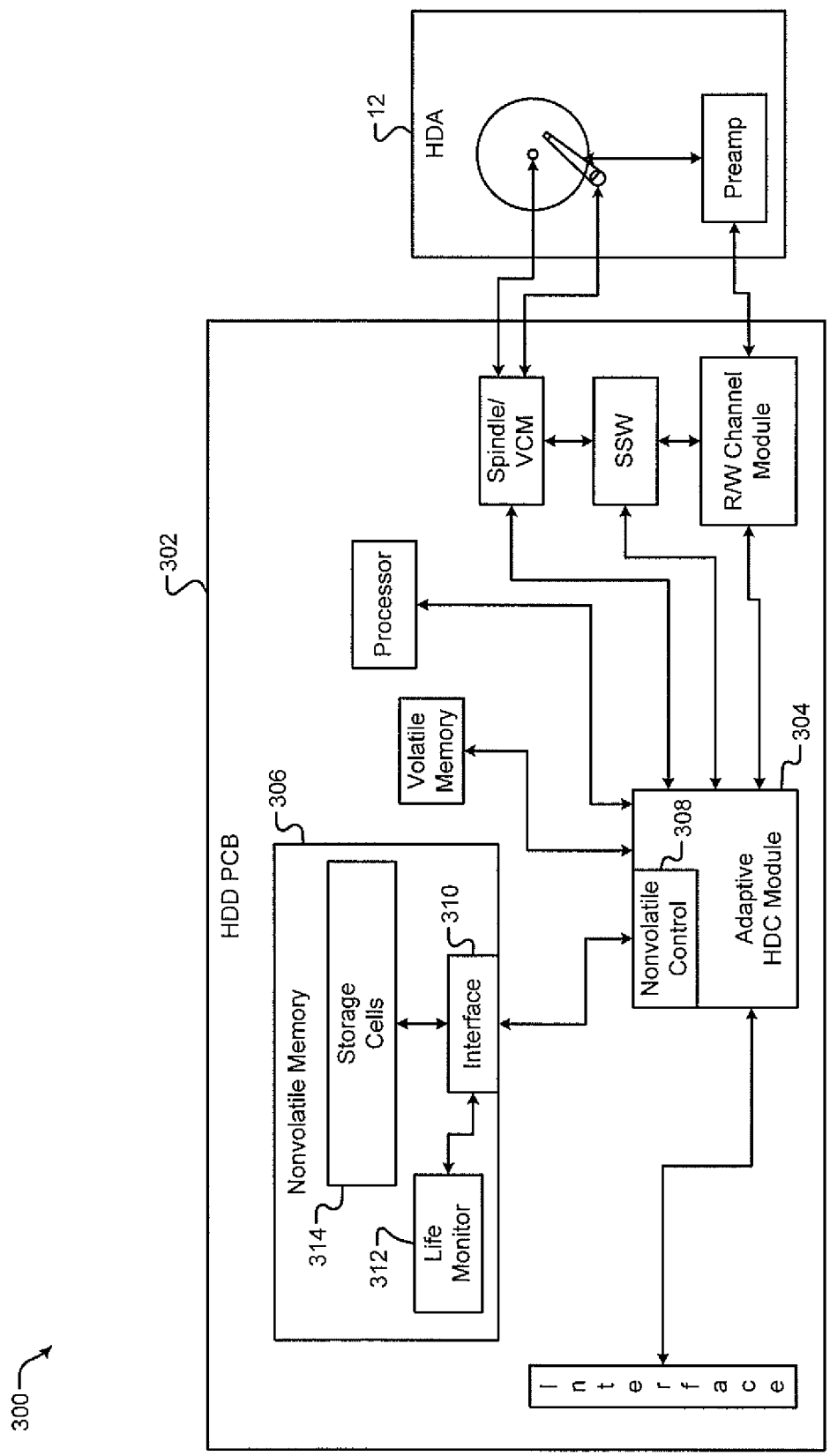

Referring now to FIG. 6, a functional block diagram of another exemplary implementation of a mass storage device is depicted. For purposes of clarity, reference numerals from FIG. 1 have been used to identify similar components. For purposes of explanation, the mass storage device is shown as a hard disk drive (HDD) 300. The HDD 300 includes the HDA 12 with an HDD printed circuit board (PCB) 302. The HDD PCB 302 includes components described above, an adaptive HDC module 304, and nonvolatile memory 306. A nonvolatile control module 308 within the adaptive HDC module 304 communicates with an interface 310 of nonvolatile memory 306.

A life monitor module 312 integrated with nonvolatile memory 306 communicates with the interface 310 and analyzes the data communicated to storage cells 314. In contrast to FIG. 5, the life monitor module 312 of FIG. 6 assumes a more passive role and monitors memory operations arriving at the interface 310. The life monitor module 312 may also at times directly control the storage cells 314 via the interface 310 in order to perform such functions as degradation testing.

Figure 7:
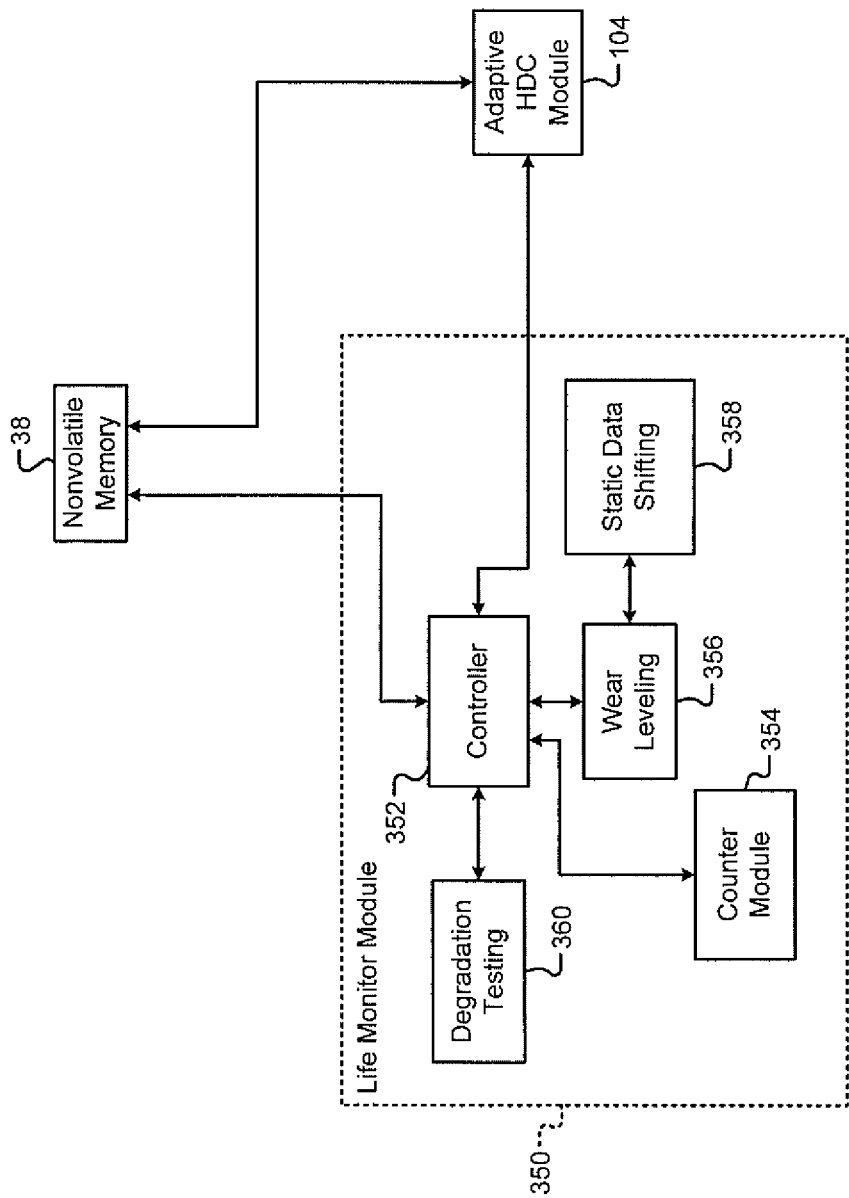
FIG. 7 is a functional block diagram of an exemplary implementation of a life monitor module.

Referring now to FIG. 7, a functional block diagram of an exemplary implementation of a life monitor module is presented. For purposes of clarity, reference numerals from FIG. 2 have been used to identify similar components. The life monitor module 350 communicates with nonvolatile memory 38 and with the adaptive HDC module 104. The adaptive HDC module 104 and nonvolatile memory 38 may communicate with each other separately from the life monitor module 350. In various implementations, the adaptive HDC module 104 can be replaced with another storage controller, such as an adaptive compact disc (CD) control module, an adaptive digital versatile disc (DVD) control module, etc.

The life monitor module 350 includes a controller 352 that estimates when the usable lifetime of nonvolatile memory 38 has been reached. The controller 352 may also perform other tasks, such as wear leveling. Functions executed by the controller 352 may alternatively be implemented in the adaptive HDC module 104, with a nonvolatile memory 38, or elsewhere, such as by a general-purpose processor.

Many types of nonvolatile memory, such as flash memory, are composed of programmable storage cells. These storage cells, however, must be erased before they can be programmed again. Each storage cell can exist in a number of states. If a cell can exist in 2 states, the cell can store 1 bit of information. In multilevel memory, a single cell may be capable of, for instance, assuming 4 or 8 states, storing 2 or 3 bits respectively. Many types of nonvolatile memory can only be erased in sections called blocks; they cannot be erased cell by cell. Therefore, in order to erase one cell, the entire block must be erased.

Program and erase cycles stress the storage cells and cause the performance of the cells to degrade. The storage cells become more difficult to be placed into their various states and are more prone to gradually changing from one state to another. This decreases reliability of their storage function. Accordingly, the life monitor module 350 may keep track of the number of program/erase cycles to determine the lifetime of nonvolatile memory 38.

The life monitor module 350 may also monitor the frequency and severity of error-correcting code (ECC), parity, or cyclic redundancy check (CRC) errors. When error rates increase, the life monitor module 350 may conclude that nonvolatile memory 38 has reached the end of its usable lifetime and/or perform further testing to determine reliability of nonvolatile memory 38. The life monitor module 350 may include a counter module 354, a wear leveling module 356, a static data shifting module 358, and a degradation testing module 360.

The controller 122 communicates with the counter module 124, which keeps track of memory operations occurring within nonvolatile memory 38. The counter module 354 may keep track of those memory operations that impact nonvolatile memory 38 most significantly or are more easily tracked. Tracking program cycles may be more difficult because program operations do not necessarily affect an entire block at once. In some implementations, the counter module 354 counts the number of times an erase has been performed.

The counter module 354 may employ a single counter, assuming that program/erase cycles will be fairly consistent across nonvolatile memory 38. Alternately, the counter module 354 may keep track of a counter value for each section of the nonvolatile memory 38, such as for each erase block. When one of the counters within the counter module 354 reaches a predetermined value, the controller 352 signals to the adaptive HDC module 104 that nonvolatile memory 38 is unreliable.

The predetermined value may represent a typical number of memory operations that nonvolatile memory 38 can sustain during its usable lifetime. The predetermined value may be determined for an individual storage cell of the nonvolatile memory 38, but becomes a block-wide number because all storage cells within a block are erased simultaneously. The predetermined value depends upon the particular implementation of nonvolatile memory 38 employed. The predetermined value may be determined or adjusted at the time of manufacturing based upon quality testing of production yields of nonvolatile memory 38.

Samples of nonvolatile memory 38 may be subjected to repeated memory operations, and the number they can sustain before exhibiting errors recorded. The numbers of the samples may be statistically analyzed, and the predetermined value can be set at or slightly below (such as 95% of) a value where a significant portion (such as 90%) of the samples were still reliable. Further, the predetermined value may be adjusted based upon operating conditions experienced by nonvolatile memory 38 during usage, such as temperature.

With a single counter, the counter module 354 may count the number of erase operations cumulatively across all blocks of nonvolatile memory. If the erase operations are evenly distributed across all blocks, the number of erase operations experienced by any single block is the value of the single counter divided by the number of blocks. The predetermined value can thus be compared with a divided single counter. Alternately, the undivided single counter can be compared to the predetermined value multiplied by the number of blocks.

If the counter module 354 is keeping track of cycles block by block, individual blocks of the nonvolatile memory 38 may be declared unreliable. This information may be communicated to the adaptive HDC module 104, or the controller 352 may simply prevent those blocks from being used. One method is to remove unreliable blocks from the memory map of nonvolatile memory 38, which may be invisible to the adaptive HDC module 104 when using logical block addressing.

In some implementations, the controller 352 communicates with the wear leveling module 356. The wear leveling module 356 spreads program/erase cycles across sections of nonvolatile memory 38 as evenly as possible. The wear leveling module 356 can accomplish this by keeping track of the program/erase cycles for sections of nonvolatile memory 38, and by directing new data to be written to those sections that have been programmed less frequently. Alternatively, the wear leveling module 356 may use a pseudo-random process to spread the writes between sections of nonvolatile memory 38. The sections monitored by the wear leveling module 356 may correspond to erase blocks of nonvolatile memory 38.

The wear leveling module 356 may communicate with a static data shifting module 358. The static data shifting module 358 attempts to account for sections of nonvolatile memory 38 where data is not altered frequently. Because the data does not change frequently, the wear leveling module 356 does not have adequate opportunity to use those sections to store new data. In other words, the sections in nonvolatile memory 38 containing static data will experience relatively fewer program/erase cycles.

The static data shifting module 358 ameliorates this problem by forcing static data to be moved into sections of nonvolatile memory 38 that have been used more frequently. The static data shifting module 358 may perform this task when the controller 352 is otherwise idle, when the static data shifting module 358 determines that some sections of nonvolatile memory 38 have experienced significantly fewer program/erase cycles, or at periodic intervals. The periodic intervals may be in units of, for example, time or number of memory operations.

The controller 352 may, in addition to or instead of using a predetermined count, perform degradation testing on nonvolatile memory 38. In some implementations, the controller 352 may communicate with the degradation testing module 360. The degradation testing module 360 may determine whether nonvolatile memory 38 is becoming unreliable more quickly than anticipated, or has maintained its reliability past when the predetermined value of program/erase cycles would indicate.

Degradation testing may be performed as a separate function, or may take place while programming and/or erasing nonvolatile memory 38. One indication that nonvolatile memory 38 is degrading is that program and/or erase times are lengthening. This may be determined by analog measurement of the success of a program or erase operation. Alternately, an interactive program/erase may be performed, in which a program/erase iteration is performed, followed by a read. This process is repeated until an adequate programmed or erased state is achieved by nonvolatile memory 38. An increased number of required iterations indicates that nonvolatile memory 38 is degraded.

The degradation testing module 360 may also write values to nonvolatile memory 38 and then read them, possibly after waiting for a specified period of time. Memory cells within nonvolatile memory 38 may exhibit a more rapid decay from one state to another when they have degraded. If the state of a cell of nonvolatile Memory 38 has decayed so much that the bit is read incorrectly, this suggests severe degradation of a cell within nonvolatile memory 38.

The controller 352 may signal to the adaptive HDC module 104 that nonvolatile memory 38 is unreliable, and then perform comprehensive degradation testing to determine the extent and location of problems with nonvolatile memory 38. Problematic sections can be removed from service and the controller 352 may signal to the adaptive HDC module 104 that nonvolatile memory 38 is once again usable.

Figure 8:
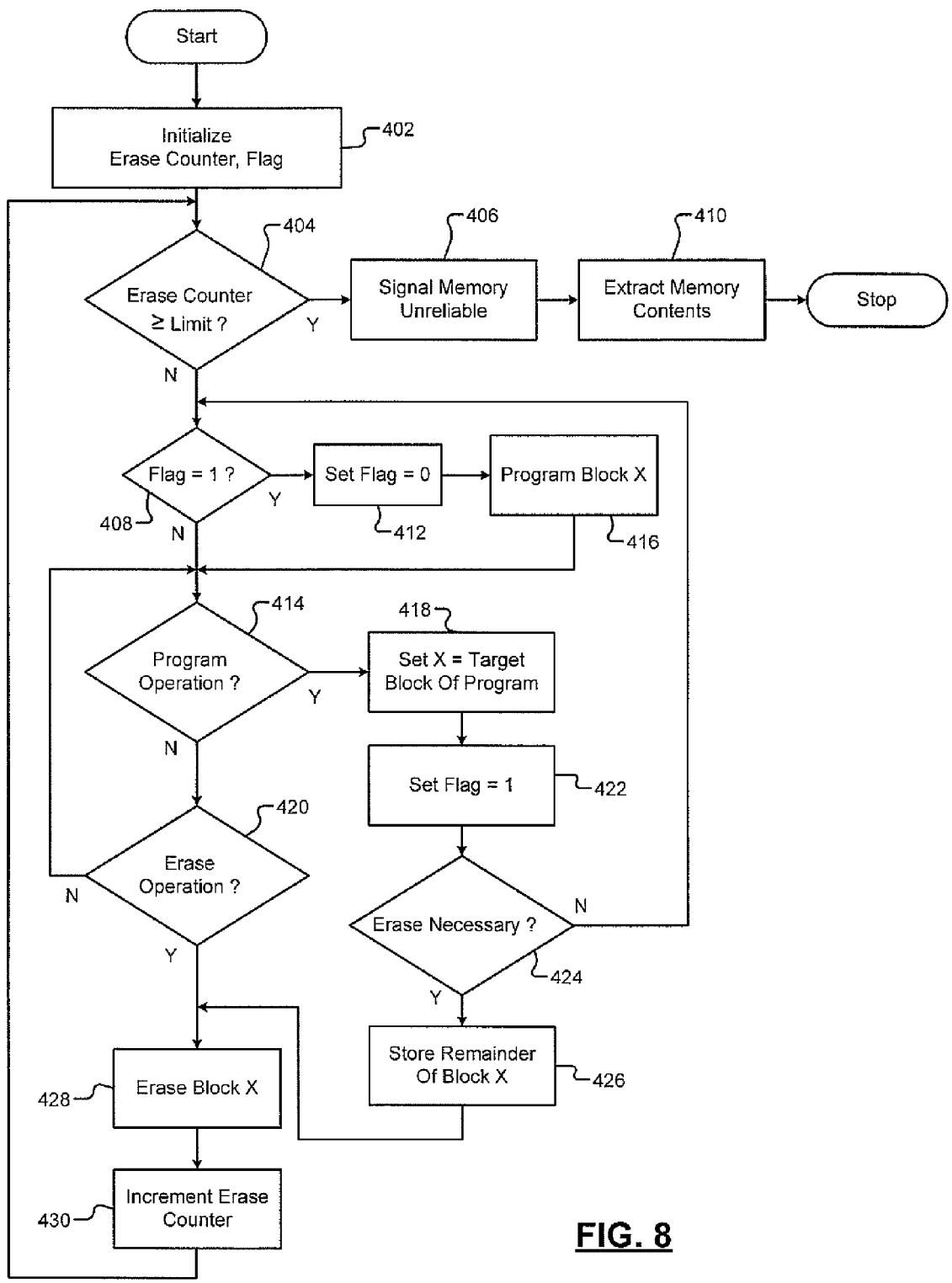
FIGS. 8-9 are flow charts depicting exemplary operation of life monitor modules.

Referring now to FIG. 8, a flow chart depicting exemplary operation of a life monitor module is presented. Control begins in step 402, where an erase counter and a flag are initialized to zero. Control transfers to step 404 where the erase counter is compared to a limit value. If the erase counter is greater than or equal to the limit value, control transfers to step 406; otherwise, control transfers to step 408.

In step 406, the erase counter has met or exceeded the limit value, meaning that the memory may now be unreliable. This fact is signaled, often to the adaptive HDC module 104. Control continues in step 408, where contents of the memory are extracted. This includes data that has not yet been programmed to memory as well as data currently residing in memory. Control then ends.

In step 408, the flag is compared to one. If the flag is equal to one, signifying that a programming operation is required, control transfers to step 412; otherwise, control transfers to step 414. In step 412, the flag is set to zero, and control continues in step 416. In step 416, a program operation on part or all of block number X is performed and control continues in step 414.

In step 414, control determines whether a program operation has been requested of the memory. If so, control transfers to step 418; otherwise, control transfers to step 420. In step 420, control determines whether an erase operation has been requested of memory. If not, control returns to step 414; otherwise, control transfers to step 428.

In step 418, the variable X is set to the target block of the program operation. Control continues in step 422, where the flag is set equal to one. Control then continues in step 424, where control determines whether an erase is necessary. An erase is necessary if the portion of block X to be programmed has already been programmed. If an erase is necessary, control transfers to step 426; otherwise, control returns to step 408.

In step 426, the portion of block X that will not be programmed is read, so that after block X is erased, the preexisting data can be reprogrammed along with the new data. Control then continues in step 428. In step 428, block X is erased, and control continues with step 430. In step 430, the erase counter is incremented and control returns to step 404.

Figure 9:
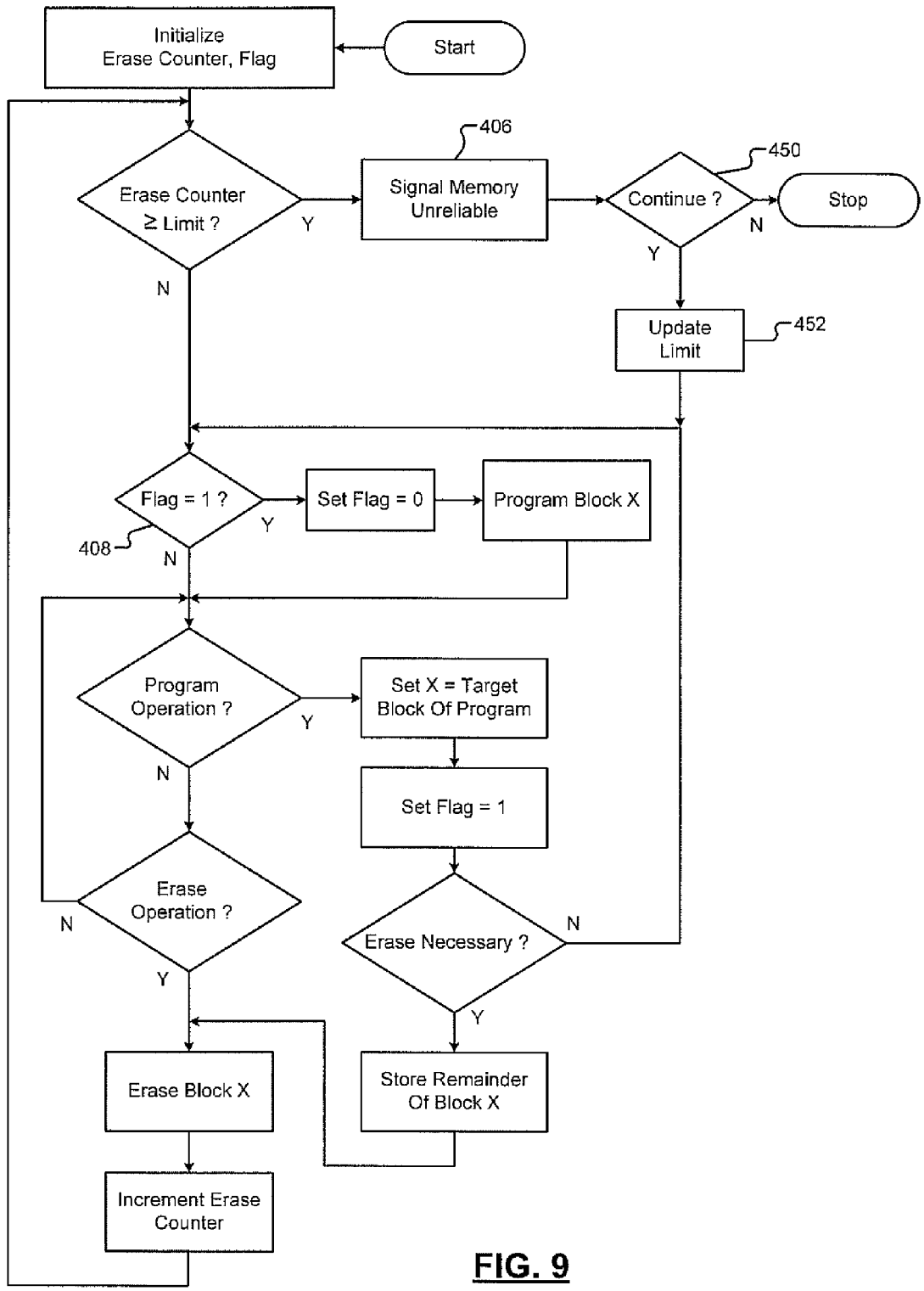

Referring now to FIG. 9, a flow chart depicting alternative operation of a life monitor module is depicted. For purposes of clarity, reference numerals from FIG. 8 have been use to identify similar steps. After control signals that memory is unreliable in step 406, control continues with step 450. In step 450, control determines whether memory will continue to be used. If so, control transfers to step 452; otherwise, control ends.

Memory may be used past its usable reliable life time for data that is error tolerant. Memory may also continue to be used if it is still reliable despite having exceeded the expected number of erase operations. In step 452, the limit value is increased, and control continues in step 408. Alternately, the erase counter could be set to zero or decreased. Either method allows memory to continue operation until the erase counter once again reaches the limit value.

Figure 10:
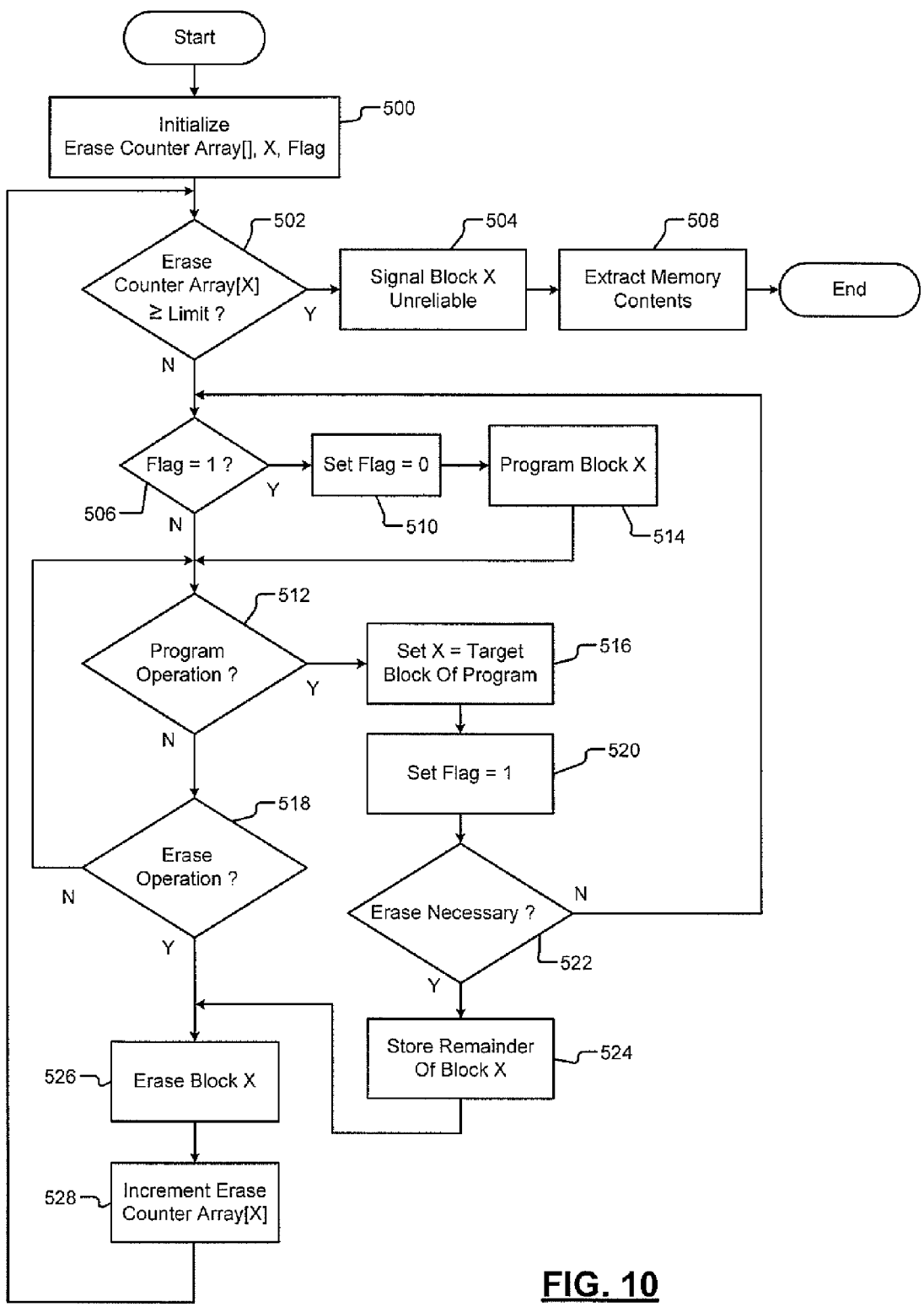
FIG. 10-11 are flow charts depicting exemplary operation of life monitor modules that maintain multiple count values.

Referring now to FIG. 10, a flow chart depicting exemplary operation of a life monitor module that maintains multiple count values is presented. Control begins in step 500, where an erase counter array, a variable X, and a flag are initialized to zero. The erase counter array contains an element for each section of the memory, such as for each erase block of memory. Control continues in step 502, where the element of the erase counter array corresponding to block X is compared with a limit value. If the erase counter array value is greater than or equal to the limit value, control transfers to step 504; otherwise, control transfers to step 506.

In step 504, control signals that block X of the memory is now unreliable. Control continues in step 506, where contents of the memory are extracted before memory becomes any less reliable. Control then ends. In step 506, the flag is compared to one. If the flag is equal to one, which indicates that a program operation is necessary, control transfers to step 510; otherwise, control transfers to step 512. In step 510, the flag is reset to zero, and control continues in step 514. In step 514, all or part of block X is programmed and control continues in step 512.

In step 512, control determines whether a program operation has been requested of memory. If so, control transfers to step 516; otherwise, control transfers to step 518. In step 516, a variable X is set to be the target block of the programming operation. The target block may be determined by the wear leveling module 356. Control then continues with step 520, where the flag is set to one. Control continues in step 522, where control determines whether an erase is necessary. If so, control transfers to step 524; otherwise, control transfers to step 506.

In step 524, portions of block X that do not have new data to be programmed are read so they can be reprogrammed after erasing block X. Control then transfers to step 526. In step 518, control determines whether an erase operation has been requested of memory. If not, control returns to step 512; otherwise, control transfers to step 526. In step 526, block X is erased and control continues with step 528. In step 528, the erase counter array element corresponding to block X is incremented and control returns to step 502.

Figure 11:
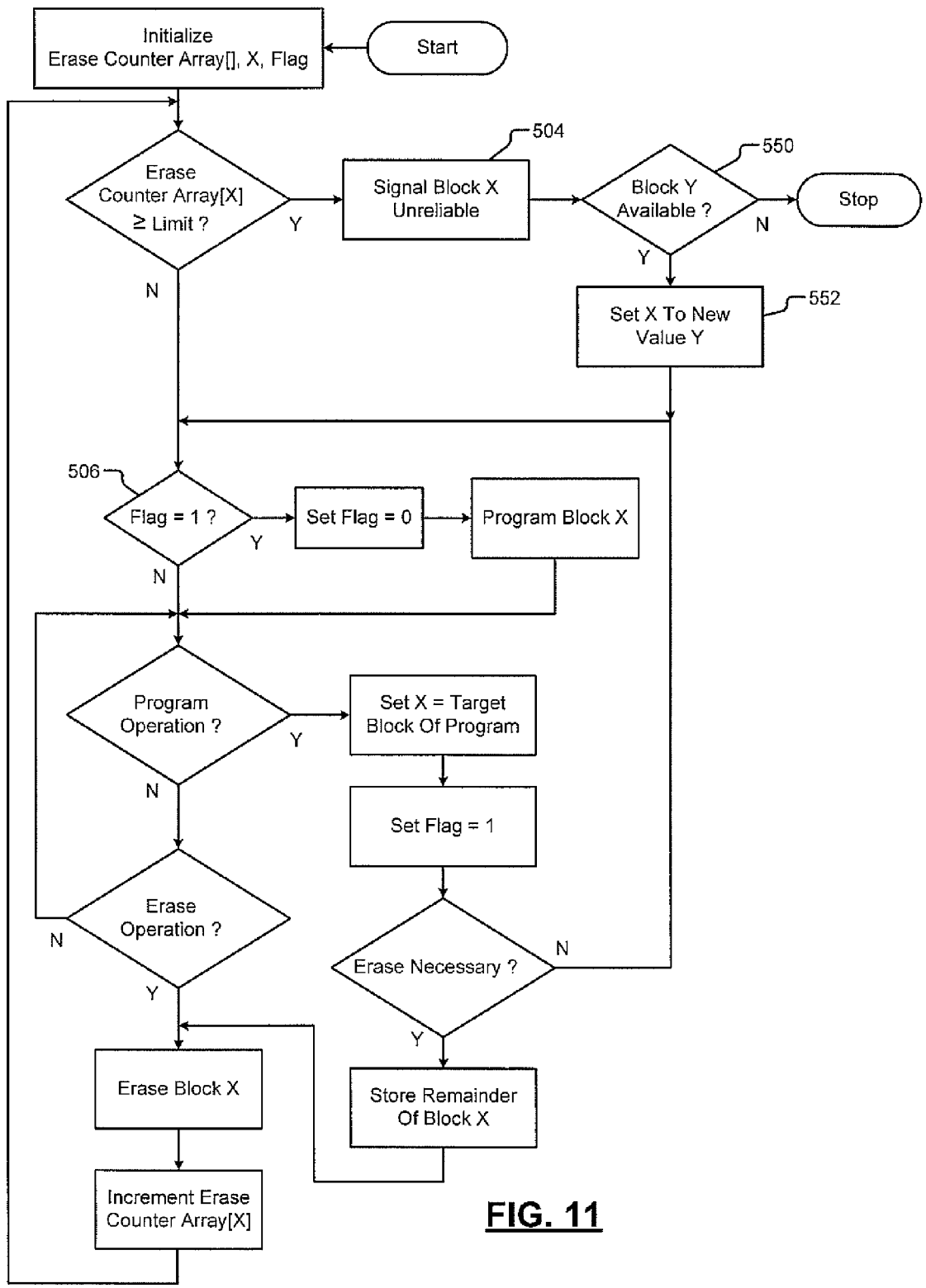

Referring now to FIG. 11, a flow chart depicting alternative operation of a life monitor module that maintains multiple count values is presented. For purposes of clarity, reference numerals from FIG. 10 have been used to identify similar steps. After control has signaled that block X is unreliable in step 504, control continues with step 550. In step 550, control determines whether another block is available in memory.

If a block that has not yet been determined unreliable is available, this block number is stored into a variable Y and control transfers to step 552; otherwise, control stops. In step 552, the variable X is set to the new value Y. This will cause the data that was to be written to unreliable block X to instead be written to block Y. Control then continues in step 506.

Figure 12:
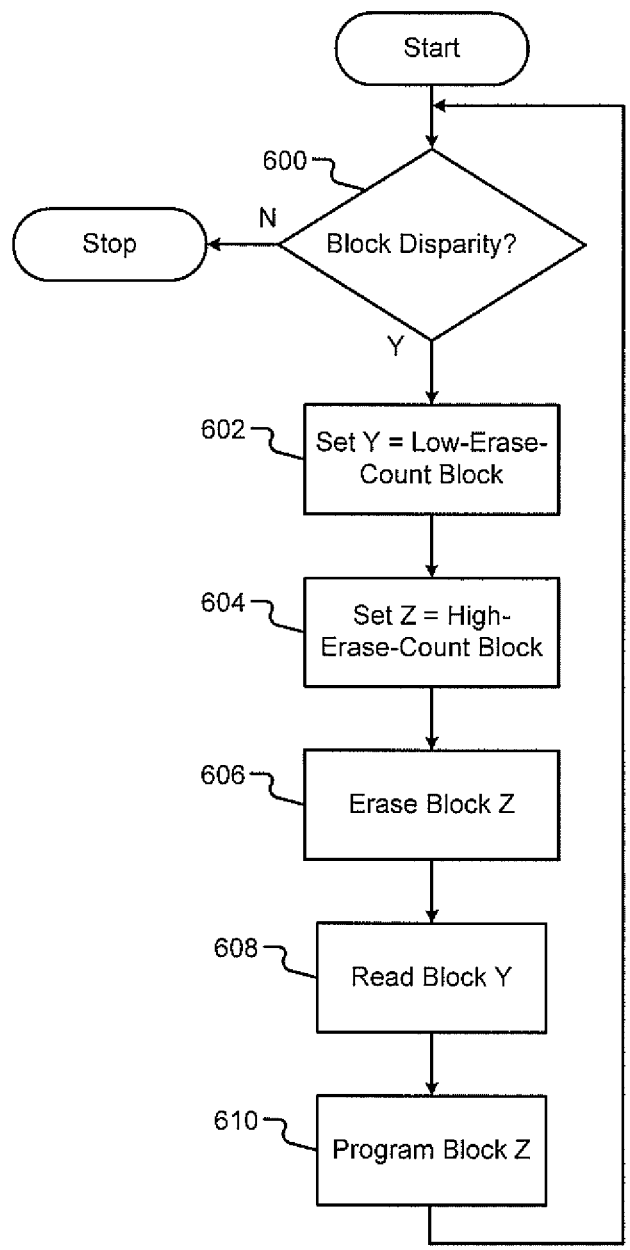
FIG. 12 is a flow chart depicting exemplary operation of a static data shifting module.

Referring now to FIG. 12, a flow chart depicting exemplary operation of a static data shifting module is presented. Control starts in step 600. As described above, operation of the static data shifting module 358 may begin at periodic intervals, as measured by memory operations or time, or at other times determined by the life monitor module 350.

In step 600, control determines whether there is a disparity in program/erase cycles between blocks of memory. If not, there is no need to shift static data and control stops. Otherwise, control transfers to step 602, where a variable Y is set to the block number of the block that has the lowest erase count. Alternately, Y could be set to the number of a block that control knows a priori contains infrequently changing data.

Control Continues in step 604, where a variable Z is set equal to the number of the block with the highest erase count. Control continues in step 606, where block Z is erased if necessary. Erasing block Z is only necessary if it has been programmed since its last erase operation. Control continues in step 608, where the contents of block Y are read. Control continues in step 610, where the contents of block Y are stored into block Z. Control then returns to step 600.

Figure 13:
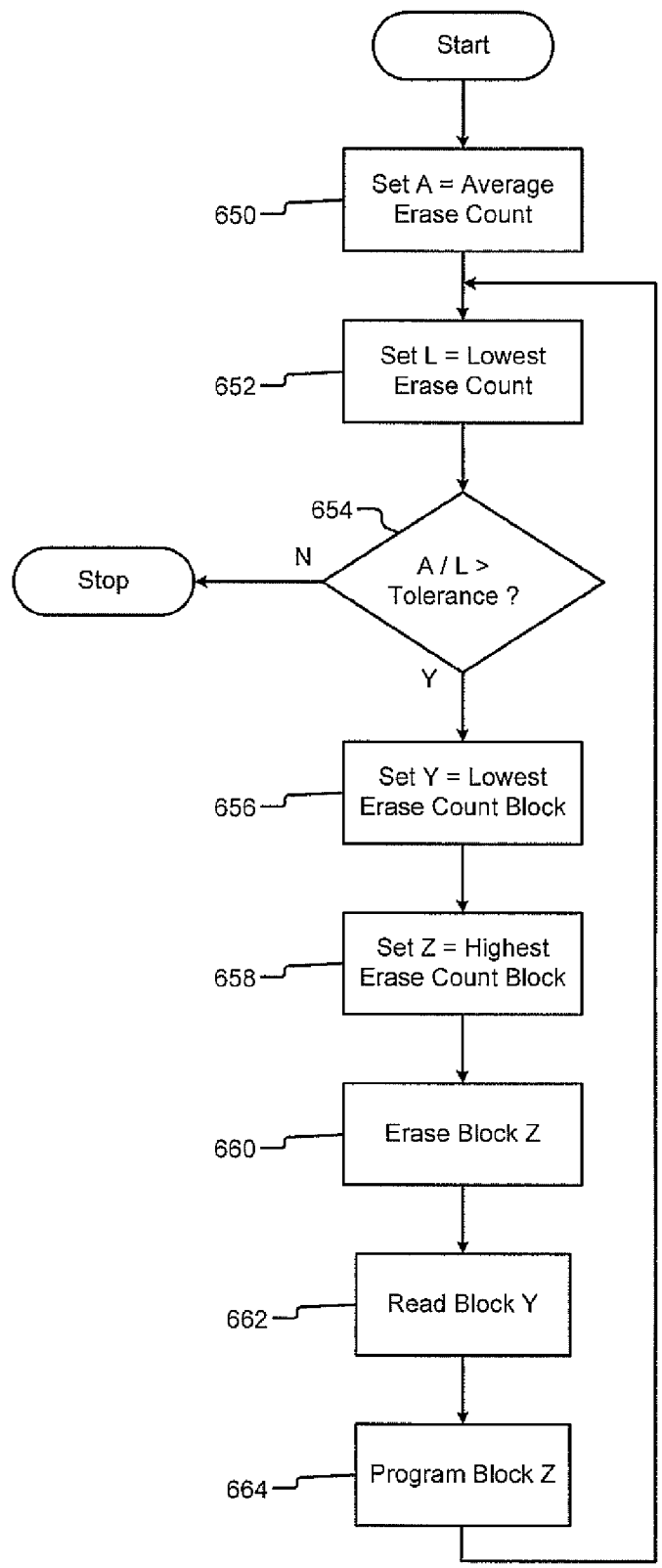
FIG. 13 is a more detailed flow chart depicting exemplary operation of a static data shifting module.

Referring now to FIG. 13, a more detailed flow chart depicting exemplary operation of a static data shifting module is presented. Control begins in step 650, where a variable A is set to the average of the erase counts of all the blocks of memory. This may be determined by cumulatively adding each of the erased counts within an erase count array, and then dividing by the number of blocks.

Control continues in step 652, where a variable L is set to the lowest erase count of any of the blocks of memory. This value may have been determined during step 650, by updating L when any lower erase count is found as the erase counts are added to produce an average. Additionally, such a method can be extended to record the lowest N erase counts during the averaging process, where N is greater than 1.

Control continues in step 654, where the values of A and L are compared. In some implementations, the result of dividing A by L is compared to a tolerance value. If A divided by L is greater than the tolerance, control transfers to step 656 in order to reduce the difference between the average erase count and the lowest erase count. Otherwise, control ends.

In step 656, the variable Y is set equal to the block number having the lowest erase count. Control continues in step 658, where a variable Z is set equal to the block number having the highest erase count. The values of Y and Z may have been determined in steps 650 and/or 652, while control is parsing the erase count of each block. Control continues in step 660, where block Z is erased. Control continues in step 662, where the contents of block Y are read. Control continues in step 664, where the contents of block Y are stored into block Z.

Control then returns to step 652. Alternately, control may return to step 650, where a new average erase count is calculated. However, this requires extra time and power, and may be skipped. Now that the lowest erase count block has been moved into a block having a higher erase count, the average erase count will have increased slightly. By neglecting to update A, the average erase count, the test performed in 654 is more likely to prove false, ending control. The average erase count will be updated when the static data shifting module 358 is next activated.

Figure 14:
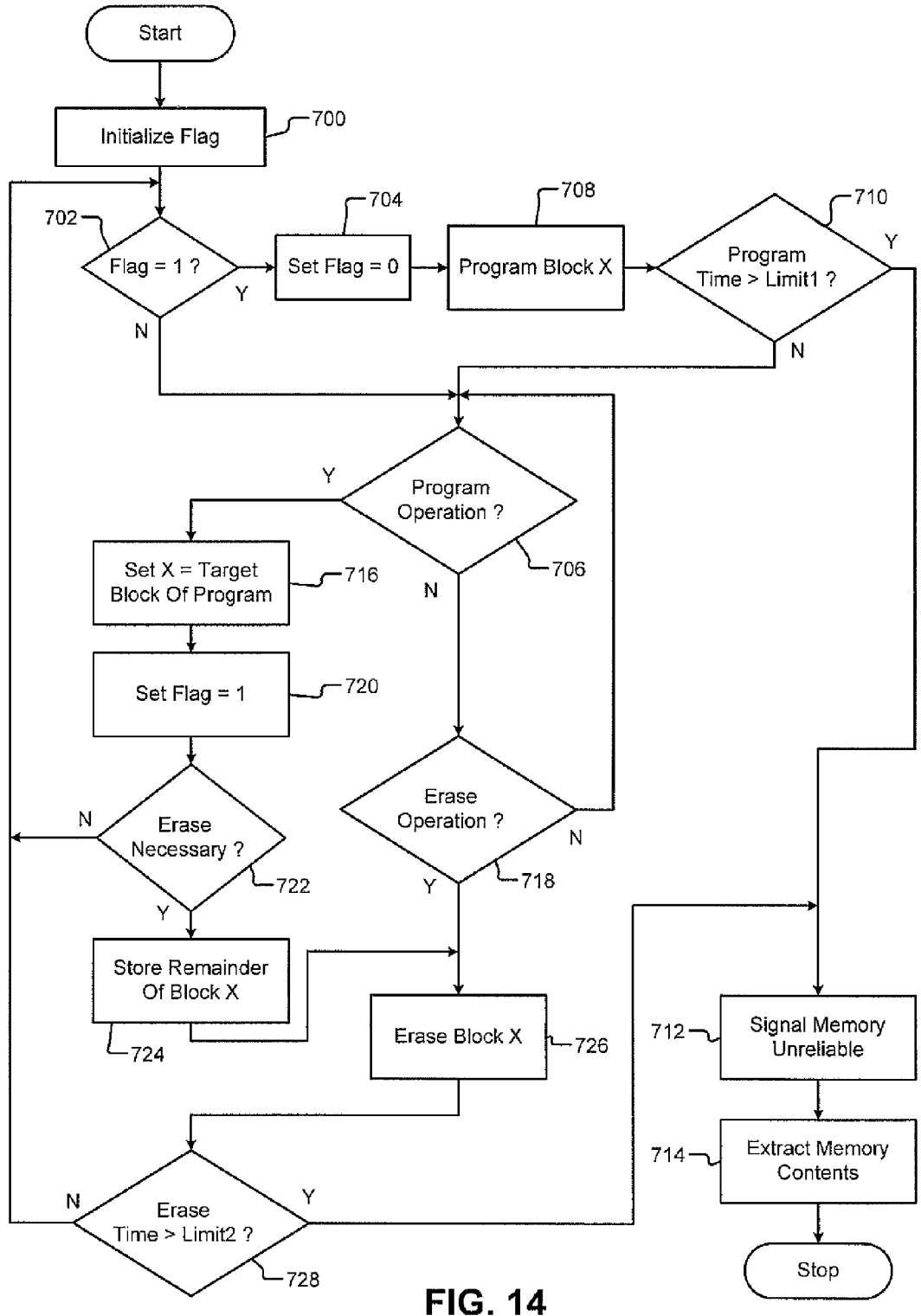
FIGS. 14-15 are flow charts depicting exemplary operation of life monitor modules incorporating degradation testing.

Referring now to FIG. 14, a flow chart depicting exemplary operation of a life monitor module incorporating degradation testing is presented. Control begins in step 700, where a flag is initialized to zero. Control continues in step 702, where the flag is compared to 1. If the flag is equal to 1, indicating that a program operation is necessary, control transfers to step 704; otherwise, control transfers to step 706. In step 704, the flag is reset to zero and control continues in step 708. In step 798, all or part of block X is programmed.

Control continues in step 710, where the amount of time required for programming is compared to a value, limit1. If the program time is greater than limit1, control transfers to step 712; otherwise, control transfers to step 706. The amount of time required for programming may be measured in actual units of time or by number of programming iterations. If more programming iterations are required for cells of block X to reach their target state, this is an indication that block X of memory may be decreasing in reliability.

In step 712, control signals that memory is unreliable. Assuming that program/erase cycles are fairly uniform across memory due to wear leveling and static data shifting, degradation of one memory block may be indicative of degradation of the entire memory. Control continues in step 714, where the contents of memory are extracted prior to memory degrading further. Control then ends.

In step 706, control determines whether a program operation has been requested of memory. If so, control transfers to step 716; otherwise, control transfers to step 718. In step 716, a variable X is set to the block number of the block where received data should be programmed. This block number may have been determined by the wear leveling module 356.

Control continues in step 720, where the flag is set equal to one. Control continues in step 722, where control determines whether an erase operation is necessary. If block X has been programmed since its last erase, an erase operation is necessary and control transfers to step 724; otherwise, control returns to step 702.

In step 724, the portion of block X that will not be overwritten with new data is stored. Control transfers to step 726, where block X is erased. In step 718, if an erase operation has been requested of memory control transfers to step 726; otherwise, control returns to step 706. In step 726, block X is erased and control transfers to step 728. In step 728, the time required to erase the cells in block X is compared to a value, limit2. If the erase time is greater than limit2, the memory may have become unreliable and control transfers to step 712; otherwise, control returns to step 702.

Figure 15:
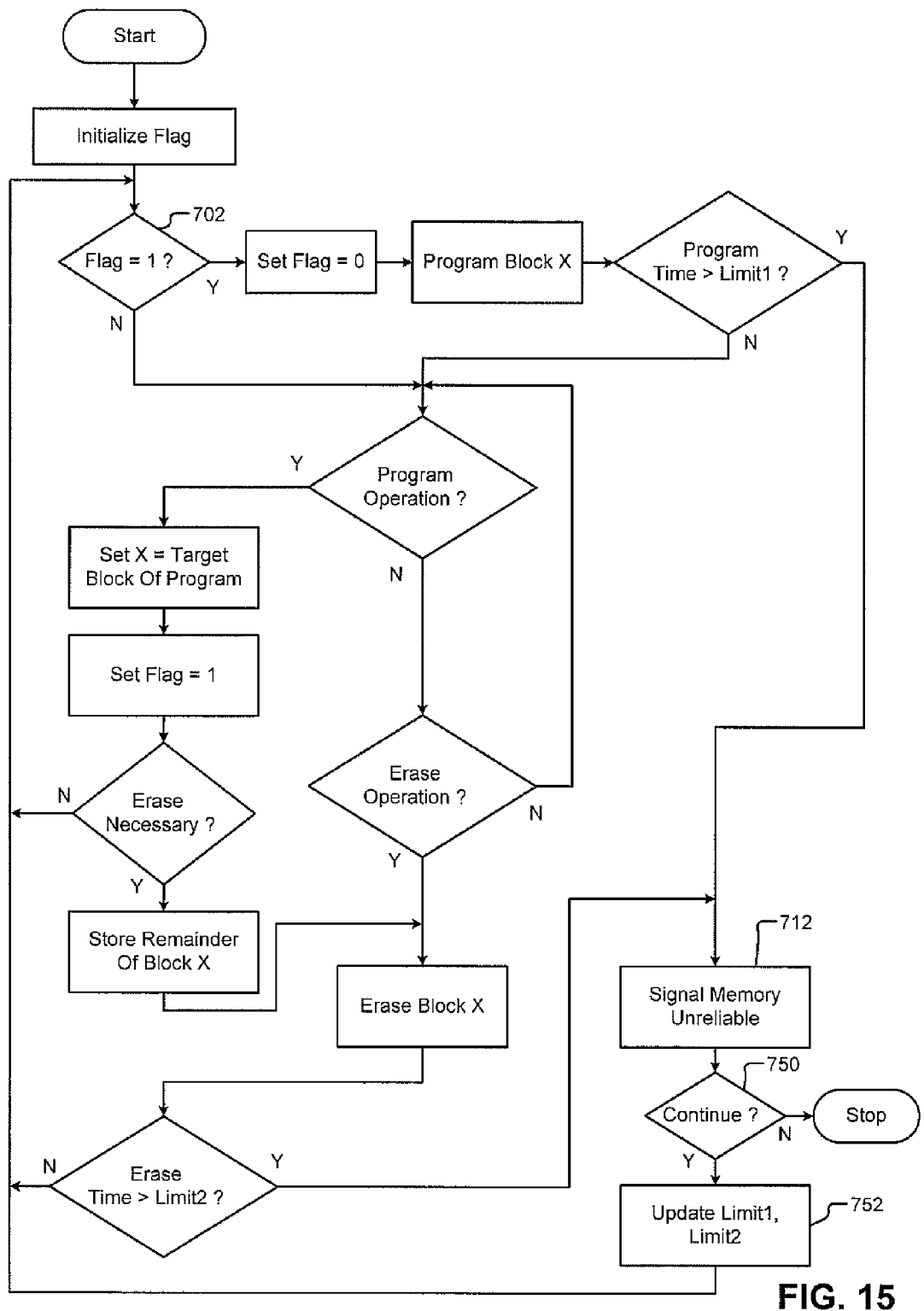

Referring now to FIG. 15, a flow chart depicting alternative operation of a life monitor module incorporating degradation testing is presented. For purposes of clarity, reference numerals from FIG. 14 have been used to identify similar steps. After control has signaled that memory is unreliable in step 712, control continues in step 750. In step 750, control determines whether memory will continue to be used by the hard disk drive. If so, control continues in step 752; otherwise, control ends.

In step 752, the values limit1 and limit2 are updated. Limit1 and limit2 are increased to permit control to use more time or more iterations to complete program and erase operations. This may be desirable when error tolerant data will be stored in memory so that the memory degradation indicated by increased program and erase times is not fatal. Limit1 and limit2 may also be updated to allow for recovery from over-programming or over-erasing of storage cells. Control then returns to step 702.

Figure 16:
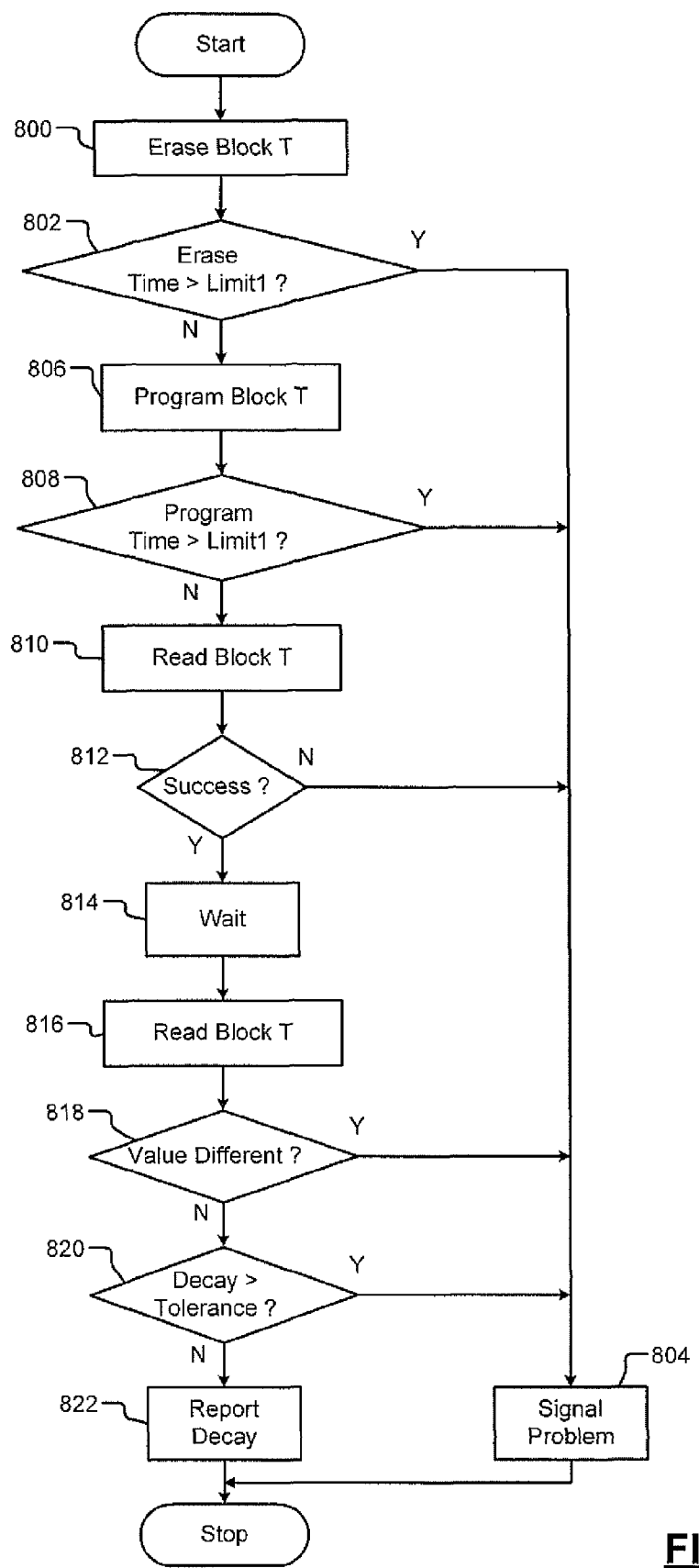
FIG. 16 is a flow chart depicting exemplary operation of the degradation testing module.

Referring now to FIG. 16, a flow chart depicting exemplary operation of the degradation testing module is presented. Control begins with step 800. The degradation testing module may be invoked at periodic intervals or when other indicators suggest that memory may be degrading. In step 800, block T is erased.

Block T may be a block of interest that was identified by other memory operations, or it could be a block chosen from memory as a representative test block. Control continues in step 802. If the time required to erase block T is greater than a value of limit1, control transfers to step 804; otherwise, control transfers to step 806.

In step 806, block T is programmed with test data, such as alternating is and 0s. Control continues in step 808. If the time required to program block T is greater than the value limit1, control transfers to step 804; otherwise, control transfers to step 810. In step 810, the contents of block T are read, and control continues in step 812. In step 812, if the contents read from block T match the values programmed into block T in step 806, control transfers to step 814; otherwise, control transfers to step 804.

In step 814, control waits for a specified period of time. This period of time should be sufficient to allow degraded memory storage cells to change from one state to another, possibly due to charge leakage or tunneling. Control continues in step 816, where the contents of block T are read. Control continues in step 818, where the values read are compared to the values read in step 810 immediately after programming. If the values are different, control transfers to step 804; otherwise, control transfers to step 820.

In step 820, analog signals are compared. If the analog level of the storage cells have decayed significantly, although not enough to produce a change in the bits represented by the storage cells, control transfers to 804. Otherwise, control transfers to step 822. In step 822, the amount of decay is reported. The amount of decay may be used to predict how much of the usable life time of memory remains, or when to next perform degradation testing. Control then ends.

Figure 17B:
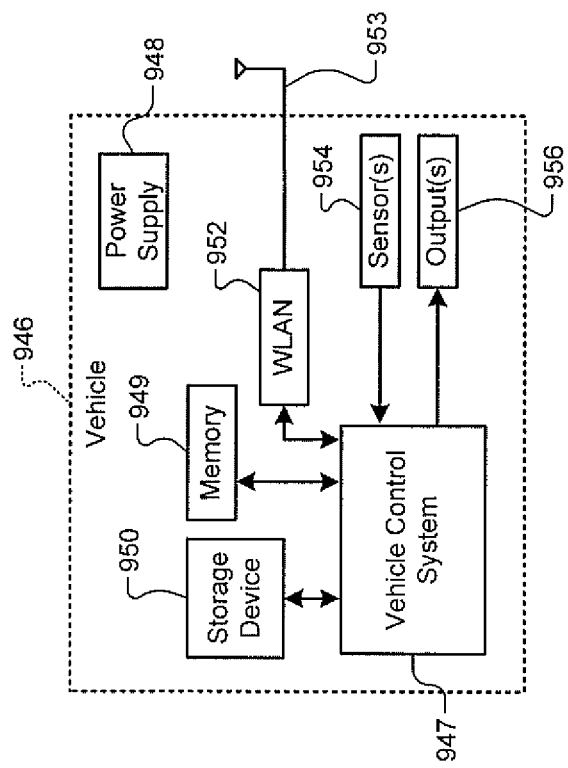
FIG. 17B is a functional block diagram of a vehicle control system.
Figure 17A:
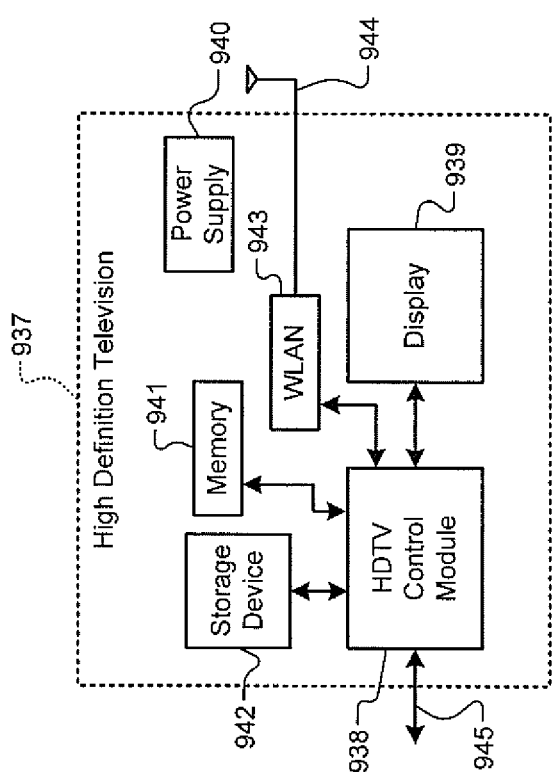
FIG. 17A is a functional block diagram of a high definition television.

Referring now to FIGS. 17A-17D, various exemplary implementations incorporating the teachings of the present disclosure are shown. Referring now to FIG. 17A, the teachings of the disclosure can be implemented in a storage device 942 of a high definition television (HDTV) 937. The HDTV 937 includes a HDTV control module 938, a display 939, a power supply 940, memory 941, the storage device 942, a WLAN interface 943 and associated antenna 944, and an external interface 945.

The HDTV 937 can receive input signals from the WLAN interface 943 and/or the external interface 945, which sends and receives information via cable, broadband Internet, and/or satellite. The HDTV control module 938 may process the input signals, including encoding, decoding, filtering, and/or formatting, and generate output signals. The output signals may be communicated to one or more of the display 939, memory 941, the storage device 942, the WLAN interface 943, and the external interface 945.

Memory 941 may include random access memory (RAM) and/or nonvolatile memory such as flash memory, phase change memory, or multi-state memory, in which each memory cell has more than two states. The storage device 942 may include an optical storage drive, such as a DVD drive, and/or a hard disk drive (HDD). The HDTV control module 938 communicates externally via the WLAN interface 943 and/or the external interface 945. The power supply 940 provides power to the components of the HDTV 937.

Referring now to FIG. 17B, the teachings of the disclosure may be implemented in a storage device 950 of a vehicle 946. The vehicle 946 may include a vehicle control system 947, a power supply 948, memory 949, the storage device 950, and a WLAN interface 952 and associated antenna 953. The vehicle control system 947 may be a powertrain control system, a body control system, an entertainment control system, an anti-lock braking system (ABS), a navigation system, a telematics system, a lane departure system, an adaptive cruise control system, etc.

The vehicle control system 947 may communicate with one or more sensors 954 and generate one or more output signals 956. The sensors 954 may include temperature sensors, acceleration sensors, pressure sensors, rotational sensors, airflow sensors, etc. The output signals 956 may control engine operating parameters, transmission operating parameters, suspension parameters, etc.

The power supply 948 provides power to the components of the vehicle 946. The vehicle control system 947 may store data in memory 949 and/or the storage device 950. Memory 949 may include random access memory (RAM) and/or nonvolatile memory such as flash memory, phase change memory, or multi-state memory, in which each memory cell has more than two states. The storage device 950 may include an optical storage drive, such as a DVD drive, and/or a hard disk drive (HDD). The vehicle control system 947 may communicate externally using the WLAN interface 952.

Figure 17D:
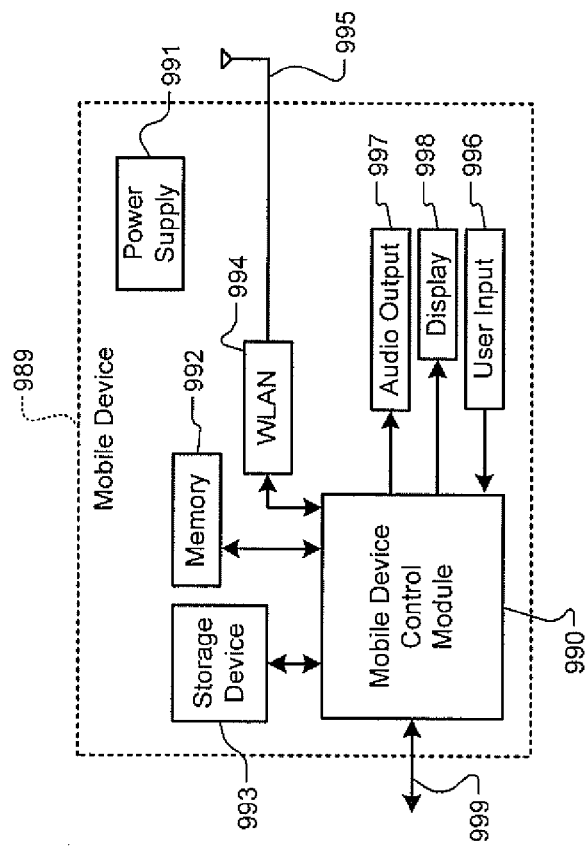
FIG. 17D is a functional block diagram of a mobile device.
Figure 17C:
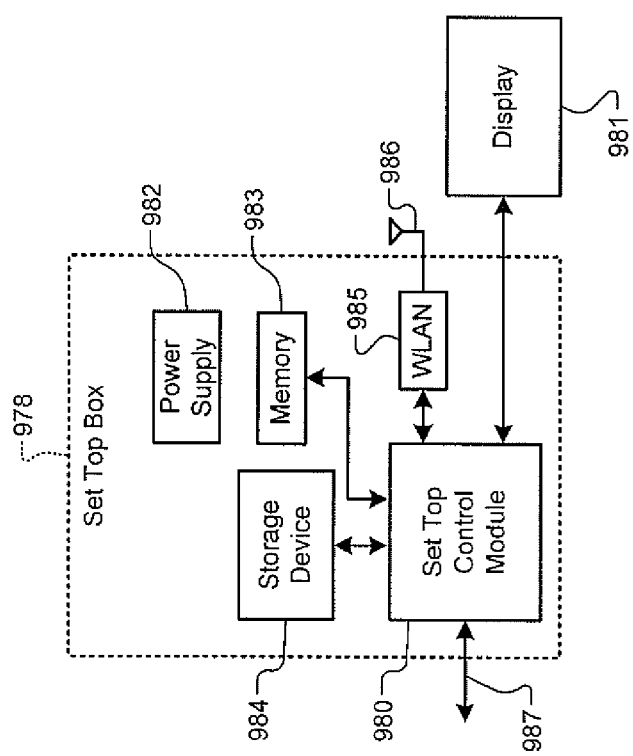
FIG. 17C is a functional block diagram of a set top box.

Referring now to FIG. 17C, the teachings of the disclosure can be implemented in a storage device 984 of a set top box 978. The set top box 978 includes a set top control module 980, a display 981, a power supply 982, memory 983, the storage device 984, and a WLAN interface 985 and associated antenna 986.

The set top control module 980 may receive input signals from the WLAN interface 985 and an external interface 987, which can send and receive information via cable, broadband Internet, and/or satellite. The set top control module 980 may process signals, including encoding, decoding, filtering, and/or formatting, and generate output signals. The output signals may include audio and/or video signals in standard and/or high definition formats. The output signals may be communicated to the WLAN interface 985 and/or to the display 981. The display 981 may include a television, a projector, and/or a monitor.

The power supply 982 provides power to the components of the set top box 978. Memory 983 may include random access memory (RAM) and/or nonvolatile memory such as flash memory, phase change memory, or multi-state memory, in which each memory cell has more than two states. The storage device 984 may include an optical storage drive, such as a DVD drive, and/or a hard disk drive (HDD).

Referring now to FIG. 17D, the teachings of the disclosure can be implemented in a storage device 993 of a mobile device 989. The mobile device 989 may include a mobile device control module 990, a power supply 991, memory 992, the storage device 993, a WLAN interface 994 and associated antenna 995, and an external interface 999.

The mobile device control module 990 may receive input signals from the WLAN interface 994 and/or the external interface 999. The external interface 999 may include USB, infrared, and/or Ethernet. The input signals may include compressed audio and/or video, and may be compliant with the MP3 format. Additionally, the mobile device control module 990 may receive input from a user input 996 such as a keypad, touchpad, or individual buttons. The mobile device control module 990 may process input signals, including encoding, decoding, filtering, and/or formatting, and generate output signals.

The mobile device control module 990 may output audio signals to an audio output 997 and video signals to a display 998. The audio output 997 may include a speaker and/or an output jack. The display 998 may present a graphical user interface, which may include menus, icons, etc. The power supply 991 provides power to the components of the mobile device 989. Memory 992 may include random access memory (RAM) and/or nonvolatile memory such as flash memory, phase change memory, or multi-state memory, in which each memory cell has more than two states. The storage device 993 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A mass storage device, comprising:
   nonvolatile semiconductor memory configured to cache data, the nonvolatile semiconductor memory having a predetermined usable lifetime;
   a degradation testing module configured to perform a degradation test on the nonvolatile semiconductor memory to determine an extent to which the nonvolatile semiconductor memory has degraded, wherein the degradation test comprises
      iteratively performing an operation on the nonvolatile semiconductor memory until the nonvolatile semiconductor memory reaches a predetermined state, wherein the operation comprises an erase operation or a program operation, and
      determining the extent to which the nonvolatile semiconductor memory has degraded in response to a number of iterations of the operation required for the nonvolatile semiconductor memory to reach the predetermined state;
   a life monitor module configured to determine whether the nonvolatile semiconductor memory has reached the predetermined usable lifetime in response to the degradation test; and
   a hard disk controller module configured to suspend the caching of data in the nonvolatile semiconductor memory in response to the nonvolatile semiconductor memory having reached the predetermined usable lifetime, wherein iteratively performing the operation on the nonvolatile semiconductor memory until the nonvolatile semiconductor memory reaches the predetermined state comprises
performing the iterations of the operation on a selected area of the nonvolatile semiconductor memory;
performing a read of the selected area of the nonvolatile semiconductor memory after each of the iterations is performed; and
ending the degradation test in response to the read indicating that the selected area of the nonvolatile semiconductor memory has reached the predetermined state, wherein the predetermined state corresponds to one of (i) a predetermined programmed state or (ii) a predetermined erased state.

2. The mass storage device of claim 1, wherein the hard disk controller module is configured to power down the nonvolatile semiconductor memory in response to the nonvolatile semiconductor memory having reached the predetermined usable lifetime.

3. The mass storage device of claim 1, wherein
the data cached in the nonvolatile semiconductor memory includes error-sensitive data and error-tolerant data; and
in response to the nonvolatile semiconductor memory having reached the predetermined usable lifetime, the hard disk controller module is configured to (i) suspend caching of the error-sensitive data in the nonvolatile semiconductor memory and (ii) continue caching the error-tolerant data in the nonvolatile semiconductor memory.

4. The mass storage device of claim 1, further comprising a wear leveling module configured to distribute memory operations substantially uniformly across the nonvolatile semiconductor memory.

5. The mass storage device of claim 1, wherein the degradation testing module is configured to initiate performance of the degradation test in response to a predetermined number of memory operations having been performed by the nonvolatile semiconductor memory.

6. The mass storage device of claim 1, wherein the degradation testing module is configured to determine the extent to which the nonvolatile semiconductor memory has degraded in response to an error rate of read operations from the nonvolatile semiconductor memory.

7. The mass storage device of claim 1, further comprising a secondary semiconductor memory, wherein the hard disk controller module is configured to cache data in the secondary semiconductor memory in response to the hard disk controller module suspending the caching of data in the nonvolatile semiconductor memory.

8. The mass storage device of claim 1, wherein the mass storage device comprises a device selected from the group consisting of a hard disk drive, a tape drive, a CD (compact disc) drive, a DVD (digital versatile disc) drive, and a network attached storage (NAS) device.

9. A method of operating a mass storage device, the method comprising:
caching data in nonvolatile semiconductor memory, the nonvolatile semiconductor memory having a predetermined usable lifetime;
iteratively performing an operation on the nonvolatile semiconductor memory until the nonvolatile semiconductor memory reaches a predetermined state, wherein the operation comprises an erase operation or a program operation, and wherein iteratively performing the operation on the nonvolatile semiconductor memory until the nonvolatile semiconductor memory reaches the predetermined state comprises
performing the iterations of the operation on a selected area of the nonvolatile semiconductor memory;
performing a read of the selected area of the nonvolatile semiconductor memory after each of the iterations is performed; and
ending performance of the iterations of the operation in response to the read indicating that the selected area of the nonvolatile semiconductor memory has reached the predetermined state, wherein the predetermined state corresponds to one of (i) a predetermined programmed state or (ii) a predetermined erased state;
determining an extent to which the nonvolatile semiconductor memory has degraded in response to a number of iterations of the operation required for the nonvolatile semiconductor memory to reach the predetermined state;
determining whether the nonvolatile semiconductor memory has reached the predetermined usable lifetime in response to the extent to which the nonvolatile semiconductor memory has degraded; and
in response to the nonvolatile semiconductor memory having reached the predetermined usable lifetime, suspending the caching of data in the nonvolatile semiconductor memory.

10. The method of claim 9, further comprising powering down the nonvolatile semiconductor memory in response to the nonvolatile semiconductor memory having reached the predetermined usable lifetime.

11. The method of claim 9, wherein:
the data cached in the nonvolatile semiconductor memory includes error-sensitive data and error-tolerant data; and
the suspending the caching of data in the nonvolatile semiconductor memory comprises (i) suspending caching of the error-sensitive data in the nonvolatile semiconductor memory and (ii) continuing caching the error-tolerant data in the nonvolatile semiconductor memory.

12. The method of claim 9, further comprising distributing memory operations substantially uniformly across the nonvolatile semiconductor memory.

13. A non-transitory computer readable medium storing a computer program, the computer program comprising instructions to cause a programmable processor to:
cache data in nonvolatile semiconductor memory, the nonvolatile semiconductor memory having a predetermined usable lifetime;
iteratively perform an operation on the nonvolatile semiconductor memory until the nonvolatile semiconductor memory reaches a predetermined state, wherein the operation comprises an erase operation or a program operation, and wherein the instructions to iteratively perform the operation on the nonvolatile semiconductor memory until the nonvolatile semiconductor memory reaches the predetermined state comprise instructions to
perform the iterations of the operation on a selected area of the nonvolatile semiconductor memory;
perform a read of the selected area of the nonvolatile semiconductor memory after each of the iterations is performed; and
end performance of the iterations of the operation in response to the read indicating that the selected area of the nonvolatile semiconductor memory has reached the predetermined state, wherein the predetermined state corresponds to one of (i) a predetermined programmed state or (ii) a predetermined erased state;

determine an extent to which the nonvolatile semiconductor memory has degraded in response to a number of iterations of the operation required for the nonvolatile semiconductor memory to reach the predetermined state;

determine whether the nonvolatile semiconductor memory has reached the predetermined usable lifetime in response to the extent to which the nonvolatile semiconductor memory has degraded; and in response to the nonvolatile semiconductor memory having reached the predetermined usable lifetime, suspend the caching of data in the nonvolatile semiconductor memory.

\* \* \* \* \*